US006636739B1

(12) United States Patent
Fagen et al.

(10) Patent No.: US 6,636,739 B1
(45) Date of Patent: Oct. 21, 2003

(54) METHOD AND SYSTEM FOR MODELING MIGRATION OF CALL TRAFFIC IN A MULTIPLE MODE WIRELESS NETWORK

(75) Inventors: Donna Fagen, Lexington, MA (US); Rajamani Ganesh, Bedford, MA (US); Dimitris N. Kalofonos, Watertown, MA (US); Vincent A. O'Byrne, Boston, MA (US)

(73) Assignee: Verizon Laboratories Inc., Waltham, MA (US)

( * ) Notice: Subject to any disclaimer, the term of this patent is extended or adjusted under 35 U.S.C. 154(b) by 462 days.

(21) Appl. No.: 09/645,738

(22) Filed: Aug. 24, 2000

(51) Int. Cl.⁷ .................................................. H04Q 7/20
(52) U.S. Cl. ...................... 455/453; 455/424; 455/67.7; 455/553.1
(58) Field of Search .................................. 455/446–449, 455/452, 453, 454, 67.1, 67.7, 423, 424, 552, 553, 452.1, 452.2, 67.11, 552.1, 553.1; 370/241

(56) References Cited

U.S. PATENT DOCUMENTS

| | | | |
|---|---|---|---|
| 5,134,709 A | 7/1992 | Bi et al. | |
| 5,561,839 A | * 10/1996 | Osterberg et al. | 455/446 |
| 5,574,466 A | 11/1996 | Reed et al. | |
| 5,710,758 A | 1/1998 | Soliman et al. | |
| 5,960,339 A | * 9/1999 | Benveniste | 455/406 |
| 5,963,867 A | 10/1999 | Reynolds et al. | |
| 6,002,934 A | 12/1999 | Boyer et al. | |

OTHER PUBLICATIONS

Hanly S., "An Algorithm for Combined Cell–Site Selection and Power Control to Maximize Cellular Spread Spectrum Capacity", IEEE Journal on Selected Areas in Communications, vol. 13, No. 7, Sep. 1995, pp. 1332–1340.

Yates R. and Huang C., "Integrated Power Control and Base Station Assignment", IEEE Transactions on Vehicular Technology, vol. 44, No. 3, Aug. 1995, pp. 634–644.

D. Calofonos and D. Fagan, "Modeling the Hand–off Mechanism Effect on the In–Cell and Other–Cell Interference of IS–95 Cellular CDMA Networks", IEEE Vehicular Technology Conference, Sep. 1999, Amsterdam, Holland, pp. 1–5.

* cited by examiner

Primary Examiner—Lee Nguyen
Assistant Examiner—Ronald J. Ward
(74) Attorney, Agent, or Firm—Leonard Charles Suchyta; James K. Weixel

(57) ABSTRACT

A computing system (36) provides a network designer with a mechanism for modeling migration, or a shift, of call traffic from a first server (26) operating using a first technology type to a second server (28) operating using a second technology type. The system (36) executes a traffic map generation process (56) for generating a first traffic map (60) responsive to a radio coverage area (30) and a call traffic load (84) for the first server (26), and for generating a second traffic map (62) responsive to a radio coverage area (32) and call traffic load (90) for the second server (28). The system (36) executes a call traffic migration modeling process (58) to adapt the second traffic map (62) to include a proportion (100) of the first call traffic load (84) to be shifted from the first server (26) to the second server (28).

19 Claims, 6 Drawing Sheets

| FIRST TRAFFIC MAP FOR FIRST SERVER (AMPS) | | SECOND TRAFFIC MAP FOR SECOND SERVER (CDMA) | |
|---|---|---|---|
| FIRST CALL TRAFFIC: 5 ERLANGS | | SECOND CALL TRAFFIC: 15 ERLANGS | |
| FIRST SERVER RADIO COVERAGE AREA (SECTIONS) | TRAFFIC (ERLANGS) | SECOND SERVER RADIO COVERAGE AREA (SECTIONS) | TRAFFIC (ERLANGS) |
| 1 | 5/50 = 0.1 | | |
| 2 | 0.1 | | |
| 3 | 0.1 | 3 | 0.15 |
| 4 | 0.1 | 4 | 0.15 |
| 5 | 0.1 | 5 | 0.15 |
| ⋮ | ⋮ | ⋮ | ⋮ |
| 50 | 0.1 | 50 | 0.15 |
| | | 51 | 0.05 |
| | | 52 | 0.05 |
| | | 53 | 0.05 |
| | | 54 | 0.15 |
| | | 55 | 0.15 |
| | | ⋮ | ⋮ |
| | | 104 | 0.15 |
| ⋮ | | ⋮ | |
| n | | n | |

FIG. 4

| UPDATED FIRST TRAFFIC MAP FOR FIRST SERVER (AMPS) | | UPDATED SECOND TRAFFIC MAP FOR SECOND SERVER (CDMA) | |
|---|---|---|---|
| FIRST CALL TRAFFIC: 3.75 ERLANGS | | SECOND CALL TRAFFIC: 16.25 ERLANGS | |
| FIRST SERVER RADIO COVERAGE AREA (SECTIONS) | TRAFFIC (ERLANGS) | SECOND SERVER RADIO COVERAGE AREA (SECTIONS) | TRAFFIC (ERLANGS) |
| 1 | 0.1 − (.25)(.1) = 0.075 | 1 | 0.0 + (.25)(.1) = 0.025 |
| 2 | 0.075 | 2 | 0.025 |
| 3 | 0.075 | 3 | .15 + (.25)(.1) = 0.175 |
| 4 | 0.075 | 4 | 0.175 |
| 5 | 0.075 | 5 | 0.175 |
| ⋮ | ⋮ | ⋮ | ⋮ |
| 50 | 0.075 | 50 | 0.175 |
|  |  | 51 | 0.05 |
|  |  | 52 | 0.05 |
|  |  | 53 | 0.05 |
|  |  | 54 | 0.15 |
|  |  | 55 | 0.15 |
|  |  | ⋮ | ⋮ |
|  |  | 104 | 0.15 |
| ⋮ |  | ⋮ |  |
| n |  | n |  |

FIG. 6

METHOD AND SYSTEM FOR MODELING MIGRATION OF CALL TRAFFIC IN A MULTIPLE MODE WIRELESS NETWORK

RELATED INVENTIONS

The present invention is related to:

"System and Method for Rapidly Determining CDMA Network Performance," by O'Byrne, et al., U.S. patent application Ser. No. 09/547,970, filed Apr. 12, 2000; and "Method And System For Associating A Server With A Location In A Cellular Network," by Vicharelli, et al., U.S. patent application Ser. No. 09/519,237, filed Mar. 6, 2000.

TECHNICAL FIELD OF THE INVENTION

The present invention relates to the field of wireless communication networks. More specifically, the present invention relates to modeling migration of call traffic in multiple mode wireless networks for use in wireless network planning tools.

BACKGROUND OF THE INVENTION

As wireless communication has become more popular, wireless service providers have felt increasingly pressured to use the wireless radio frequency,(RF) spectrum as efficiently as possible. Greater efficiency allows a service provider to carry more calls using a given amount of RF spectrum. The problem of efficiently assigning the given amount of RF spectrum within a wireless network is a complex one.

Some wireless communication networks have traditionally employed analog technology such as the Advanced Mobile Phone Service (AMPS). AMPS employs frequency modulated transmission on a finite number of thirty kilohertz channels. An ever increasing subscriber base has overloaded the RF spectrum allocated to such analog systems, sometimes leading to blocked calls and decreased quality of service.

As demand for wireless service has grown, wireless carriers have been developing innovative solutions to meet increasing capacity needs. As a result, digital technologies, such as Code Division Multiple Access (CDMA), Time Division Multiple Access (TDMA), Global System for Mobile Communications (GSM), and so forth, are emerging to coexist with and possibly eventually replace the analog technology. Such digital technology results in substantial increases of capacity of the RF spectrum, for example, up to ten times that of analog technology. In addition, digital technology has the potential to mitigate three major problems encountered by users of analog technology, that is, static, loss/interruption of signal when passing between cells, and failure to get a connection because of congestion.

Multiple mode refers to a wireless communication network that employs more than one communication technology. A multiple mode network can be a network that employs a combination of two or more analog and digital technologies or a network that employs only multiple digital technologies. One exemplary multiple mode network is a combined dual mode analog and digital network. Such a dual mode network is typically used when a carrier has an analog technology infrastructure in place and begins a migration, or shift, to a digital technology. An immediate conversion to a digital wireless technology can be very costly. Thus, multiple mode networks, such as the exemplary dual mode analog/digital network, serve as transition networks between an entirely analog network and an entirely digital network. Examples of multiple mode networks include AMPS/CDMA, AMPS/TDMA, TDMA/GSM, AMPS/CDMA/TDMA, and so forth.

Automated approaches to network planning are being developed to assist carriers in efficiently assigning the given amount of RF spectrum, i.e., channels, for wireless networks. Some of these automated network planning tools involve simulating the actual wireless network to predict the propagation of radio frequency (RF) signals in order to define the radio coverage areas for the servers (i.e., closest base stations from a signal propagation viewpoint), to characterize potential interference within a simulated environment in order to effectively make channel assignments, to perform traffic analysis, and so forth.

Generally, traffic analysis is the analysis of traffic density, capacity, and call patterns specifically for system performance improvement. Traffic analysis may be performed by engineers utilizing a network planning tool to determine the number and the kinds of circuits and the quantities of related terminating and switching equipment needed to meet current and anticipated call traffic loads throughout a communication network.

A realistic representation of the radio coverage areas for servers in the simulated wireless network and the call traffic loads, or total traffic carried during a specified time interval by each server, are useful for subsequent related activities such as CDMA planning, frequency assignment, and so forth. Accurate traffic analysis is particularly significant when determining the ability of a multiple mode network to accommodate the migration, or shift, of call traffic from the analog to the digital technology. An accurate model of call traffic migration from, for example, the existing analog infrastructure to an emerging digital technology, is important for evaluating the ability of the digital technology to accommodate the increased call traffic loads, to predict the costs and resource constraints associated with adjusting transmission power, to perform a successful hand down of call traffic from the digital to the analog technology, and so forth.

One prior art network modeling tool performs traffic analysis for only a single technology type, that is, an analog system. In this prior art network modeling tool, if a second technology type is to be modeled, for example, CDMA, the digital call traffic data is distributed over the radio coverage area served by the analog technology with no recognition of the unique characteristics or settings of the digital technology. In particular, this prior art network modeling tool is unable to accommodate the differences between radio coverage areas for each of the analog and digital systems. A radio coverage area for a CDMA server may differ from that of an AMPS server because CDMA is a power-controlled system whose performance is very sensitive to multiple user interference. A CDMA system will try to meet a given objective and ensure that a minimum or required signal level is always met. As such, in an actual environment a radio coverage area for a CDMA server may differ from the radio coverage area for an AMPS server, even when the CDMA and AMPS servers are located at the same cell site.

In a multiple mode network planning tool, an additive distribution of digital technology call traffic over the existing analog technology radio coverage area could create an artificial characteristic for the traffic, give a less accurate estimate of the interference, and cause too dense or too sparse a build up of needed capacity. As a result, there exists a need for a system and method that accurately models call traffic migration from an existing communication technology to an emerging communication technology.

SUMMARY OF THE INVENTION

Accordingly, it is an advantage of the present invention that a method and system are provided for modeling a migration of call traffic from a first server to a second server in a multiple mode wireless network.

Another advantage of the present invention is that the system and method accurately model call traffic migration by taking into account the unique characteristics of the technologies utilized in the multiple mode wireless network.

Another advantage of the present invention is that the system and method utilize radio coverage areas that closely depict the actual radio coverage areas of each of the first and second servers so that call traffic loads for overlapping cells may be accurately portrayed.

It is yet another advantage of the present invention that the method and system can rapidly accommodate changes in call traffic loads and migration patterns.

The above and other advantages of the present invention are carried out in one form by a computer-based method for modeling migration of call traffic from a first server to a second server. The first server operates using a first technology type and a second server operates using a second technology type in a multiple mode wireless network. The method calls for generating a first traffic map having a first call traffic load distributed over a first radio coverage area of the first server, and generating a second traffic map having a second call traffic load distributed over a second radio coverage area of the second server. The method further calls for determining a proportion of the first call traffic load to shift from the first server to the second server, and adapting the second traffic map to include the proportion of the first call traffic load.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 4 shows a data structure of first and second traffic maps generated through the execution of the traffic map generation process of FIG. 3;

FIG. 6 shows a data structure of updated first and second traffic maps generated through the execution of the call traffic migration modeling process of FIG. 5.

DETAILED DESCRIPTION OF THE PREFERRED EMBODIMENTS

Figure 1:
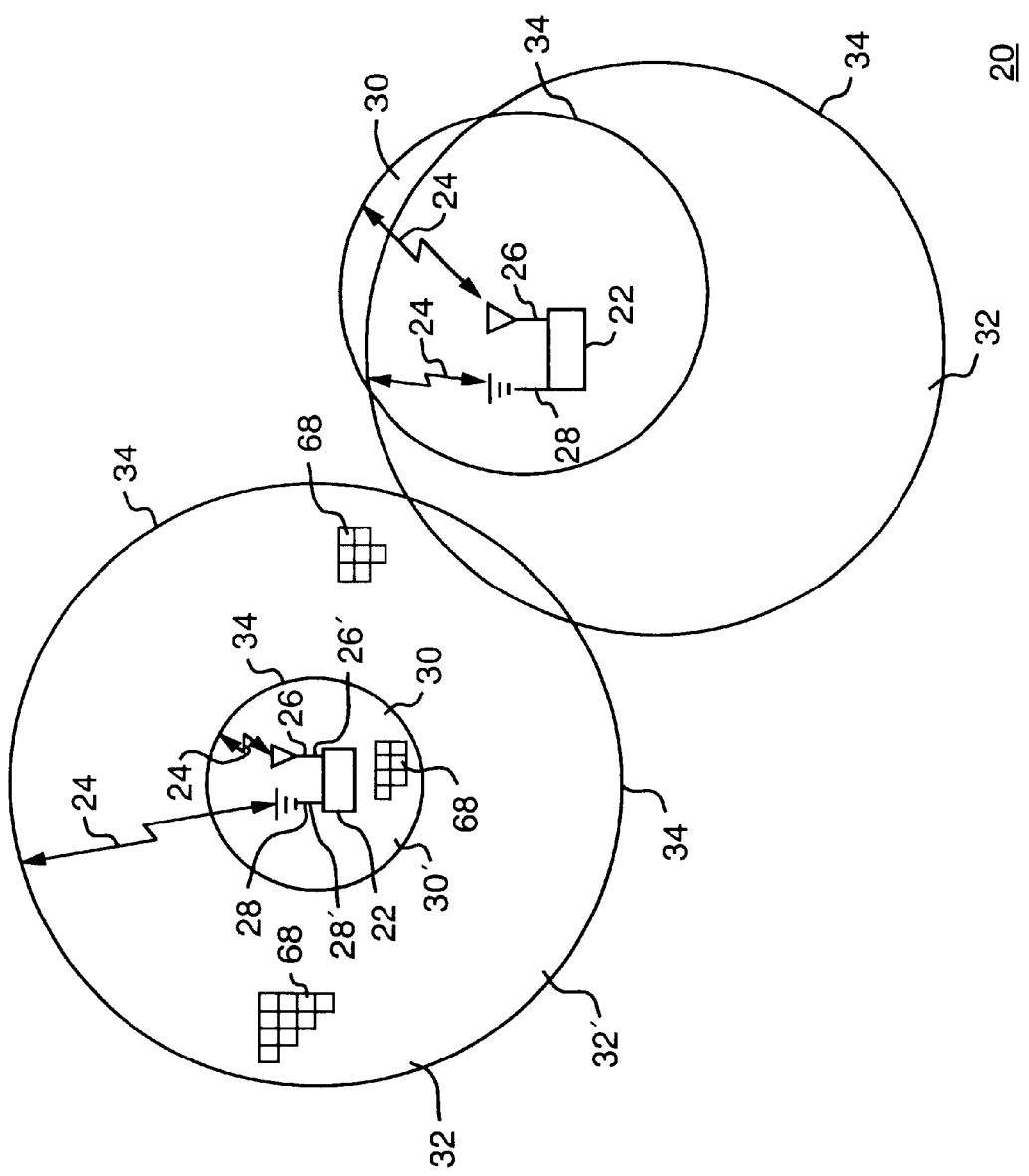
FIG. 1 shows a schematic layout diagram of a multiple mode wireless communication network.

FIG. 1 shows a schematic layout diagram of a multiple mode wireless communication network 20. Multiple mode network 20 includes a number cell sites 22 through which radio links 24 are established between network 20 and mobile handsets (not shown). Cell sites 22 of multiple mode network 20 include servers 26 that operate using a first technology type and, servers 28 that operate using a second technology type.

Network 20 illustrates servers 26 that operate using a first technology type and servers that operate using a second technology type for clarity of illustration. Thus, multiple mode wireless network 20 is a dual mode network. However, it should be understood that the present invention is not limited to dual mode networks. Rather the present invention may be employed in multiple mode networks that combine more than two communication technologies.

For clarity of illustration, each of servers 26 includes an antenna and associated transmit and receive circuitry (not shown) for providing analog technology wireless communication, such as AMPS service. As such, servers 26 will be referred to hereinafter as AMPS servers 26. Likewise, each of servers 28 includes an antenna and associated transmit and receive circuitry (not shown) for providing digital technology wireless communication, such as CDMA service. As such, servers 28 will be referred to hereinafter as CDMA servers 28.

The present invention is described in terms of a multiple mode network that operates using analog AMPS technology and digital CDMA technology for clarity of illustration. However, it should be understood that the present invention is not technology dependent. Rather, the present invention may be applied to other multiple mode networks, such as AMPS/TDMA, TDMA/GSM, AMPS/CDMA/TDMA, and so forth.

As shown in multiple mode network 20, AMPS servers 26 and CDMA servers 28 are co-located at cell sites 22. Such an arrangement typically occurs in a brownfield network in which an analog infrastructure is in place at cell sites 22 and an emerging technology, exemplified by CDMA servers 28, is being added. However, AMPS servers 26 and CDMA servers 28 need not be co-located.

Each AMPS server 26 controls communication in at least one AMPS cell 30 or a sector (not shown) of cell 30. Likewise, each CDMA server 28 controls communication in at least one CDMA cell 32 or a sector (not shown) of cell 32. In other words, AMPS cells 30 represent the geographic radio coverage areas of AMPS servers 26, and CDMA cells 32 represent the geographic radio coverage areas of CDMA servers 28. Servers 26 and 28 may couple to mobile telephone switching offices (not shown) in a manner well known in the art.

For clarity of illustration, AMPS and CDMA servers 26 and 28, respectively, are shown as having generally omni-directional antenna-patterns. In other words, cells 30 and 32 are not sectored. However, it should be readily apparent to those skilled in the art that any or all of cells 30 and 32 may be subdivided into sectors that are controllable by sector server elements that include directional antennas. In addition, cells 30 and 32 are shown as being generally circular in shape. This circular representation is convenient for schematically denoting a cell's radio coverage area. Those skilled in the art will appreciate that the actual shape and size of cells 30 and 32 will vary from cell to cell, and between technology types.

Network 20 shows each of AMPS cells 30 and CDMA cells 32 delineated by theoretical boundaries 34. Of course, it is well known in the telecommunications industry that control of wireless communication in an actual wireless environment is not rigidly divided as indicated by boundaries 34. Rather, overlap of wireless communication coverage occurs along theoretical boundaries 34 between neighboring cells using a common technology, such as between AMPS cells 30 and between CDMA cells 32. In addition, in multiple mode network 20, AMPS and CDMA cells 30 and 32 being served by AMPS and CDMA servers 26 and 28 that are co-located at one of cell sites 22, significantly overlap one another.

Multiple mode network 20 is shown with only two of AMPS cells 30 and two of CDMA cells 32 to provide exemplary scenarios in which two or more cells 30 and 32 may overlap. Those skilled in the art will recognize that a conventional multiple mode wireless communication network can include many more cells 30 and 32.

As digital wireless technology evolves and the advantages of digital wireless technology over analog technology become more apparent, it is anticipated that analog subscribers will switch, or migrate, from using analog wireless technology to using the digital wireless technology. The present invention advantageously models this migration to evaluate the ability of CDMA servers 28 to accommodate the increased call traffic loads, to set transmission power levels of CDMA servers 28, to determine the quantities of related terminating and switching equipment needed to meet the increased traffic loads, to make channel assignments, and so forth.

Figure 2:
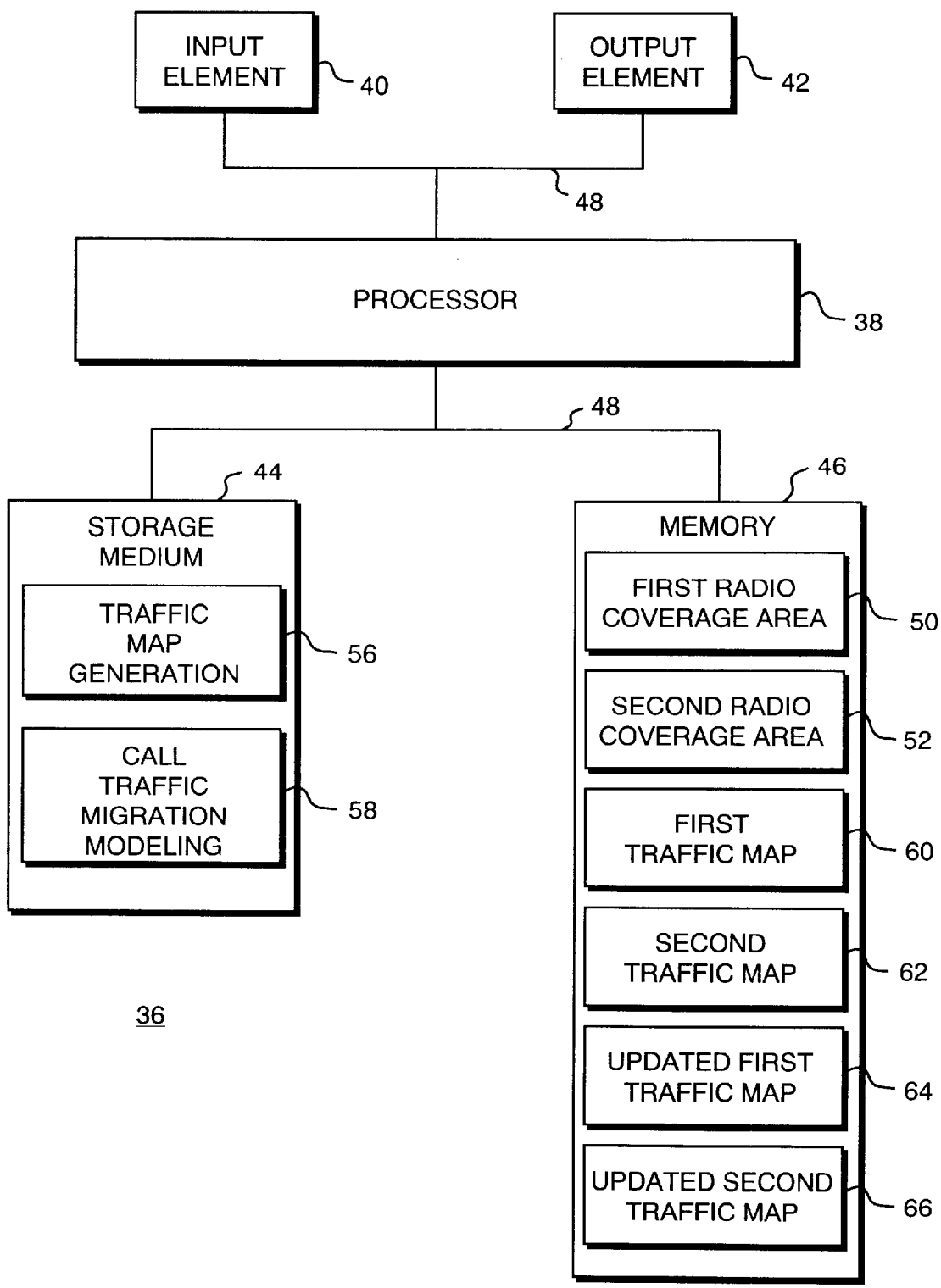
FIG. 2 shows a simplified block diagram of a computing system for modeling migration of call traffic.

FIG. 2 shows a simplified block diagram of a computing system 36 for modeling migration of call traffic in accordance with a preferred embodiment of the present invention. System 36 includes a processor 38 on which the methods according to the invention can be practiced. Processor 38 is in communication with an input element 40, an output element 42, a computer-readable storage medium 44, and memory 46. These elements are interconnected by a bus structure 48. The components of system 36 may be implemented utilizing several known off-the-shelf components.

Memory 46 is addressable storage space, accessible by processor 38, which stores information or instructions for use. Processor 38 includes a data reader (not shown) for reading information from memory 46, such as a first radio coverage area database 50 describing a first one of AMPS cells 30' (FIG. 1) and second radio coverage area database 52 describing a second one of CDMA cells 32' (FIG. 1). The data reader may include a hard disk drive internal or external to processor 38, a tape drive, floppy disk drive, CD-ROM, or a combination thereof. Memory 46 may be a hard disk, floppy disk, a compact disk, a personal computer memory card international association (PCMCIA) card, and the like.

Referring momentarily to FIG. 1, network 20 is subdivided into a plurality of sections 68, of which only a few are shown. Sections 68 are the basic units that make up network 20. Since network 20 simulates an actual multiple mode wireless environment, each of sections 68 represents the smallest area of interest, i.e. a location, in the actual environment. For example, each of sections 68 may represent a location in the actual environment having an area of approximately one hundred meters by one hundred meters. The actual size of the location is a tradeoff between accuracy (more locations, or higher resolution) and increased processing speed (fewer locations, or reduced resolution).

Referring back to FIG. 2 in connection with FIG. 1, first radio coverage area database 50 includes a subset of sections 68 describing first AMPS cell 30' for which first AMPS server 26' is most likely to provide communication services. The subset of sections 68 describing first AMPS cell 30' may be derived utilizing a radio propagation prediction tool, such as that described in "Method And System For Associating A Server With A Location In A Cellular Network", U.S. patent application Ser. No. 09/519,237, incorporated herein by reference. The radio propagation tool associates a server with a location in a simulated cellular network to simulate radio coverage areas that closely portray the actual wireless environment so that call traffic loads for overlapping cells may be accurately predicted and the capacity of the network correctly estimated.

Second radio coverage area database 52 includes a subset of sections 68 describing first CDMA cell 32' for which first CDMA server 28' is most likely to be providing communication services. The subset of sections 68 describing first CDMA cell 32' may be derived utilizing a radio propagation prediction tool specific to CDMA, such as that described in "System and Method for Rapidly Determining CDMA Network Performance", U.S. patent application Ser. No. 09/547,970, incorporated herein by reference. A CDMA radio propagation prediction tool desirably takes into account the characteristics unique to CDMA. For example, the CDMA specific radio propagation tool, incorporated herein by reference, accounts for the distribution of the traffic in a CDMA network to define the total interference of a network plan and uses this information to determine the total power necessary to transmit. The tool also desirably takes into account the behavior of various types of cell sites, such as traffic, border, beacon cell sites, and the interaction of these cell sites with each other, digital to analog handdown areas, provides the ability to trade off various levels of system accuracy with speed and complexity, and provides the ability to determine the most probable server based on the highest ratio of the pilot strength to the total interference ($E_c/I_o$) at a location.

Input device 40 can encompass a keyboard, mouse, pointing device, audio device (e.g., a microphone), or any other device providing input to processor 38. Output device 42 can encompass a display, a printer, an audio device (e.g., a speaker), or other devices providing output from processor 38. Input and output devices 40 and 42 can also include network connections, modems, or other devices used for communications with other computer systems or devices.

Computer-readable storage medium 44 may be a hard disk drive internal or external to processor 38, a magnetic disk, compact disk, or any other volatile or non-volatile mass storage system readable by processor 38. Computer-readable storage medium 44 may also include cooperating or interconnected computer readable media, which exist exclusively on computing system 36 or are distributed among multiple interconnected computer systems (not shown) that may be local or remote.

Executable code for performing traffic analysis, in the form of a traffic map generation process 56 and a call traffic migration modeling process 58, is recorded on computer-readable storage medium 56. Processes 56 and 58 are implemented in a network planning tool (not shown) for instructing processor 38 to model call traffic migration in a multiple mode wireless environment, such as network 20 (FIG. 1).

Traffic map generation process 56 includes program code for generating traffic maps (described below) in response to the receipt of first radio coverage area database 50, second radio coverage area database 52, and an amount of AMPS and CDMA call traffic controllable by AMPS and CDMA servers 26 and 28, respectively (FIG. 1). Call traffic migration modeling process 58 includes program code for modeling migration of a proportion of call traffic (described below) from one of AMPS servers 26 (FIG. 1) to one of CDMA servers 28 (FIG. 1). Memory 46 has stored therein first and second traffic maps 60 and 62, respectively, generated during the execution of traffic map generation process 56, and updated first and second traffic maps 64 and 66 generated during the execution of call traffic migration modeling process 58.

Although processor 38 is described as performing traffic map generation process 56 and call traffic migration modeling process 58, it should be readily understood that processor 38 may be utilized to execute some or all of a plurality of processes that form a multiple mode wireless network planning tool. These processes may include, for example, generation of first and second radio coverage area databases 52 and 54 describing first AMPS and CDMA cells 30' and 32', respectively, interference characterization, and channel assignments processes. Alternatively, different portions of processes 56 and 58 may be distributed over a plurality of processors.

Figure 3:
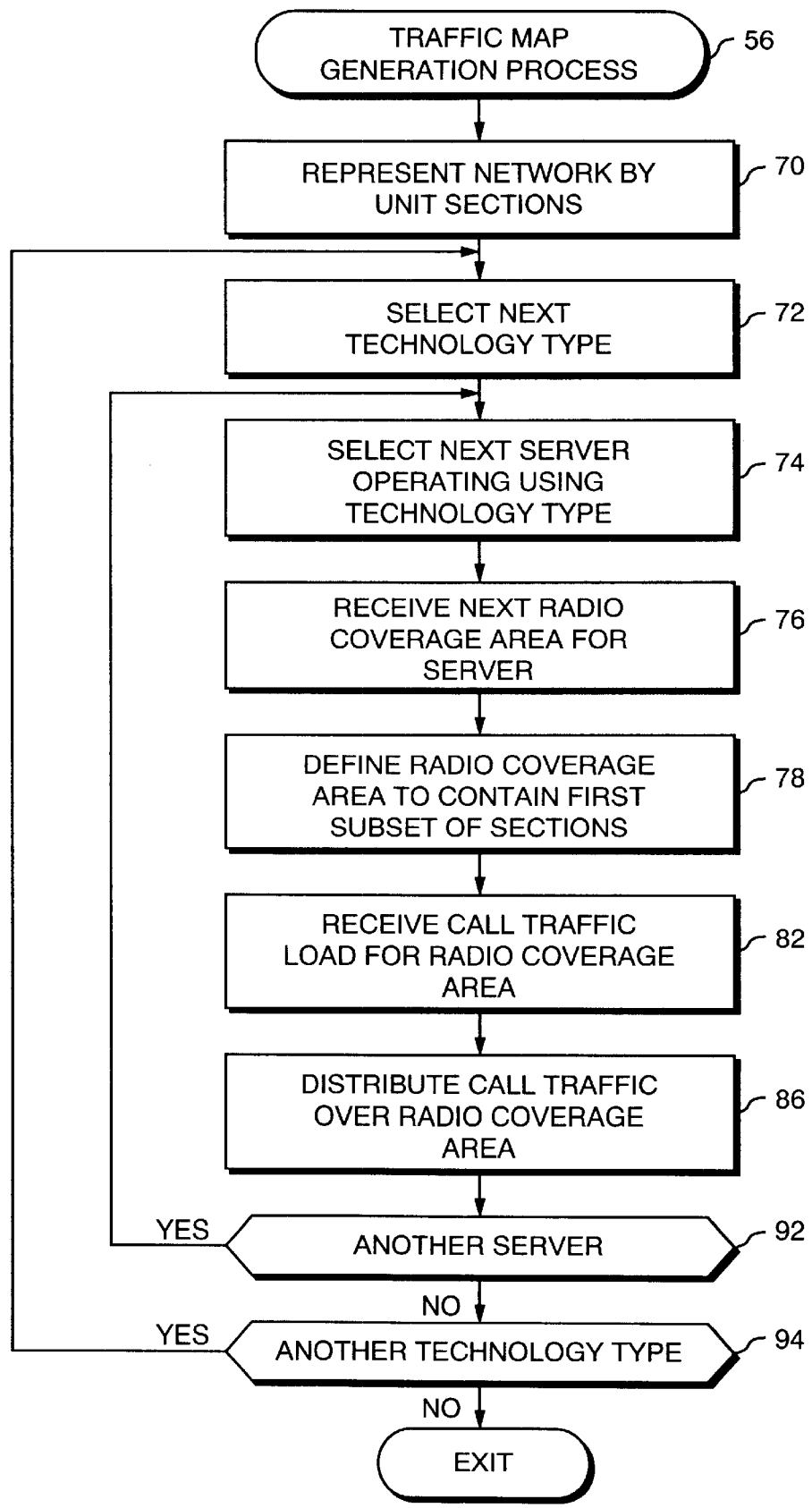
FIG. 3 shows a flow chart of a traffic map generation process.

FIG. 3 shows a flow chart of traffic map generation process 56. Traffic map generation process 56 may be performed for each of AMPS and CDMA servers 26 and 28, respectively, to create traffic maps, for example, first and second traffic maps 60 and 62, respectively.

Process 56 begins with a task 70. Task 70 causes process 38 (FIG. 2) to represent network 20 (FIG. 1) by sections 68 (FIG. 1). As discussed previously, network 20 (FIG. 1) is subdivided into a plurality of sections 68, of which only a few are shown. Since network 20 simulates an actual wireless environment, each of sections 68 relates to the smallest area of interest, i.e. portable or mobile location, in the actual environment. Sections 68 may be described in terms of location coordinates related to the actual environment, for example, latitude and longitude.

FIG. 4 shows a data structure 71 of first and second traffic maps 60 and 62, respectively, generated through the execution of the traffic map generation process 56. For clarity of illustration, sections 68, in each of maps 60 and 62 are identified by consecutive numbers, 1 through n.

Although task 70 is described as being performed during the execution of process 56, it should be understood that network 20 may have been represented by sections 68 during previously performed processes. The subdivision of network 20 into sections 68 is performed to provide consistency between the definition of radio coverage areas, i.e., AMPS and CDMA cells 30 and 32, respectively, of AMPS servers 26 and CDMA servers 28.

With continued reference to FIGS. 3 and 4, following task 70, a task 72 is performed. At task 72, processor 38 (FIG. 2) selects a next technology type. For example, since multiple mode network 20 includes AMPS technology and CDMA technology, task 72 one of the AMPS and CDMA technologies. By way of example, task 72 selects the existing infrastructure, that is, AMPS technology.

In response to task 72, a task 74 is performed. Task 74 causes processor 38 to select a next server operating using the selected technology type. For example, since AMPS technology was selected at task 72, one of AMPS servers 26 will be selected. Again, for clarity of description, task 74 selects first AMPS server 26' for first traffic map 60.

A task 76 is performed in connection with task 74 to receive the radio coverage area for the selected server. The radio coverage area is the area within network 20 (FIG. 1) where the selected server is the most probable server. Accordingly, at task 76, processor 38 accesses memory 46 to receive first radio coverage area database 50 (FIG. 2) related to first AMPS server 26'.

A task 78 may be performed in connection with task 76. At task 78, the selected radio coverage area is defined to contain a subset of sections 68. For example, a first subset of sections 80 (FIG. 4), labeled 1–50, defines first AMPS cell 36' of first AMPS server 26', as shown in first traffic map 60.

Following task 78, a task 82 is performed. At task 82, a call traffic load for the selected radio coverage area is received. The call traffic load may be received as an input from a network developer via input element 40 (FIG. 2) of computing system 36 (FIG. 2). The call traffic load may be a figure representing a totality of transmitted and received calls in a given unit of time for the selected technology. Alternatively, the call traffic load may be a figure that estimates the number of transmitted and received calls that may be attempted during a unit of time. In the exemplary scenario, a first call traffic load 84 for first AMPS server 26' is 5 Erlangs.

A task 86 is performed in response to task 82. At task 86, processor 38 distributes first call traffic load 84 over first subset of sections 80 defining first AMPS cell 30'. Accordingly, in the ongoing exemplary scenario, each of sections 68 of first subset of sections 80 is uniformly distributed a portion, or amount of call traffic 87, of first call traffic load 84. Since first subset 80 includes fifty of sections 68, a uniform distribution of first call traffic load 84 results in amount of call traffic 87 being 0.1 Erlangs distributed to each of sections 68 of first subset 80.

The call traffic load need not be distributed uniformly as indicated in first traffic map 60. For example, second traffic map 62 shows first CDMA cell 32' (FIG. 1) defined to contain a second subset of sections 88, labeled 3–104, for first CDMA server 28'. A second call traffic load 90 of 15 Erlangs for first CDMA cell 32' is non-uniformly distributed over sections 68 of second subset of sections 88. That is, sections 68, labeled 3–50 and 54–104 are provided with amounts 89, of 0.15 Erlangs of second load 90, while sections 68, labeled 51–53, are provided with amounts 91, of 0.05 Erlangs of second load 90.

The non-uniform distribution of call traffic load 90 more accurately portrays sections 68 of first CDMA cell 32' which are likely to have less call traffic than other sections 68 of first CDMA cell 32'. Such sections 68 may be those sections over water, heavily forested areas having much lower permanent or transient population, or rural versus urban regions of first CDMA cell 32'. Alternatively, some of sections 68 may have a greater portion of call traffic load 90. For example, if the selected one of servers 26 and 28 is located in a rural region, call traffic may be largely centered over sections 68 through which highways are routed. Accordingly, processor 38 (FIG. 2) may distribute more of the call traffic load to sections 68 containing highways and less of the call traffic load to sections 68 that do not contain-highways.

Referring back to process 56, distributing task 86 results in a traffic map describing a call traffic load distributed over a radio coverage area for the selected one of servers 26 and 28 (FIG. 1). In response to the execution of task 86, first traffic map 60 is generated for first AMPS server 26'. Following task 86, process 56 performs a query task 92.

Query task 92 determines if there is another server of the selected technology type for which traffic map generation process 56 is to be performed. For example, query task 92 determines if there is another one of AMPS servers 26 (FIG. 1) for which process 56 is to be performed.

When query task 92 determines that there is another server, for example, another one of AMPS servers 26, program control loops back to task 74 to generate a traffic map for a next selected server. However, when query task 92 determines that there is not another server, for example, another one of AMPS servers 26, process 56 proceeds to a query task 94 to determine if there is another one of the technology types for which traffic map generation process 56 is to be performed.

When query task 94 determines that there is another technology type, for example, CDMA, process 56 loops back to task 72 to select the next technology type and to generate traffic maps for servers operating using this next technology type. When query task 94 determines that there is not another technology type, process 56 exits. Accordingly, query task 94 causes process 56 to be performed for all of the technology types present in a multiple mode wireless network.

The product of the execution of process 56 are traffic maps, for example first and second traffic maps 60 and 62 (FIG. 4), that define radio coverage areas for each of servers 26 and 28 (FIG. 1) and the call traffic load distributed across the defined radio coverage areas through multiple mode wireless communication network 20 (FIG. 1). Traffic maps 60 and 62 are stored in memory 46 (FIG. 2) of computing system 36 (FIG. 2) for later access when executing call traffic migration modeling process 58 (FIG. 2).

Figure 5:
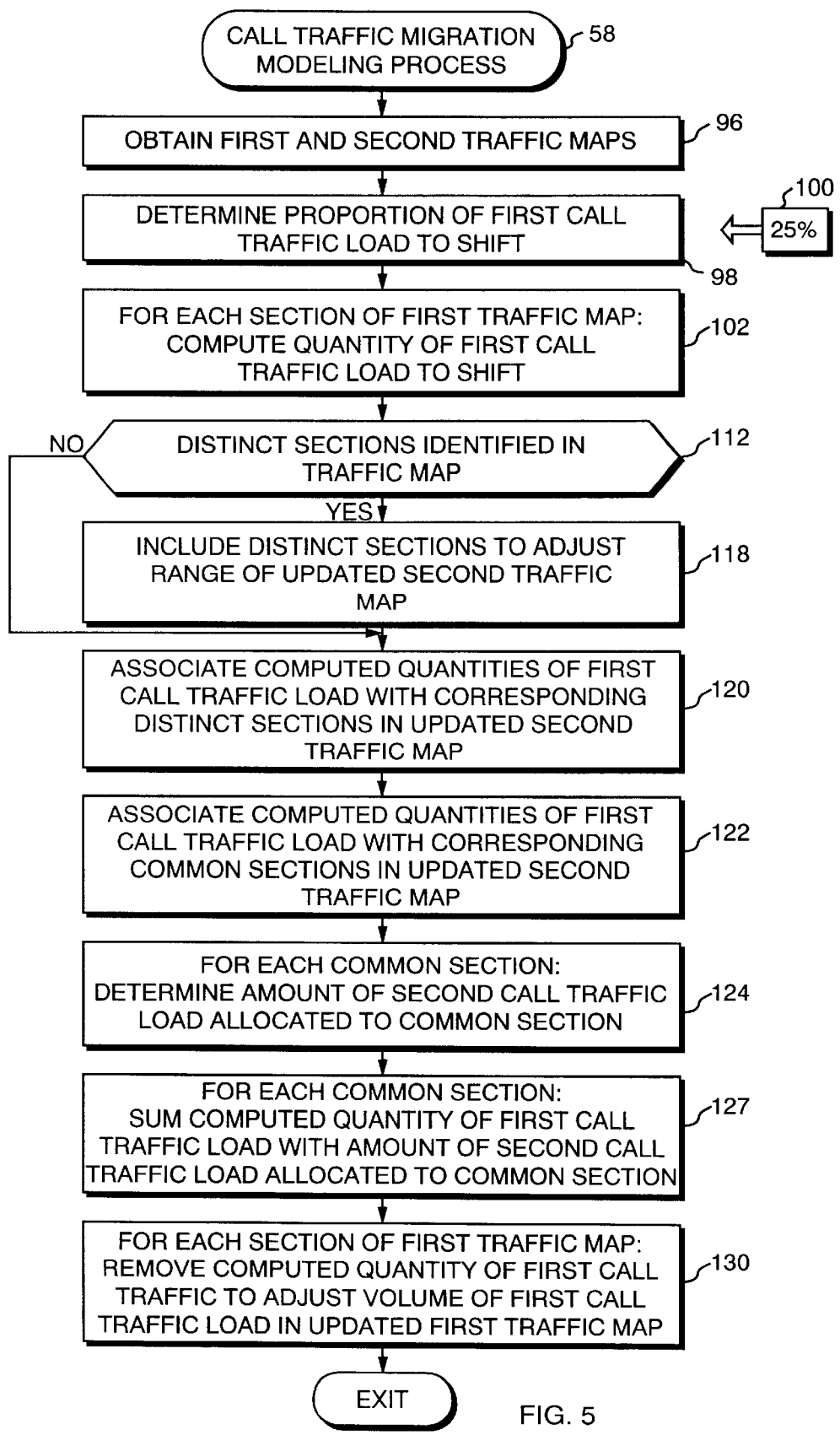
FIG. 5 shows a flow chart of a call traffic migration modeling process.

FIG. 5 shows a flow chart of call traffic migration modeling process 58. Process 58 is performed to model migration, or a shift, of call traffic from a first technology, such as AMPS, to a second technology, such as CDMA, in multiple mode network 20 (FIG. 1). The information derived through the execution of process 58 is used in further network planning to evaluate the ability of the emerging technology to accommodate the increased call traffic loads, to set transmission power levels, to determine the quantities of related terminating and switching equipment needed to meet the increased traffic loads, to make channel assignments, and so forth.

Process 58 begins with a task 96. Task 96 causes processor 38 (FIG. 1) to access memory 46 (FIG. 1) to obtain first and second traffic maps 60 and 62, respectively (FIG. 4). First and second traffic maps 60 and 62 are used to illustrate the execution of process 58. However, it should be understood that any of the traffic maps (not shown) generated during the execution of process 56 may be selected when performing call traffic migration modeling process 58.

Following task 96, a task 98 is performed. At task 98, processor 38 (FIG. 2) determines a proportion of first call traffic load 84 (FIG. 4) to migrate, or shift. That is, based on future projections, processor 38 determines the amount of call traffic currently managed by the existing technology (i.e., AMPS) that will shift over a period of time to the emerging technology (i.e., CDMA). This proportion may be entered via input element 40 (FIG. 2) of computing system 36 (FIG. 2) by a network developer. For example, a proportion FIG. 100 of twenty-five percent is input via input element 40. Proportion FIG. 100 represents the proportion of first call traffic load 84 (FIG. 4) controlled by first AMPS server 26' that may migrate to first CDMA server 28' over a period of time. Thus, in the exemplary illustration, proportion FIG. 100 of twenty-five percent indicates that approximately twenty-five percent of the call traffic currently controlled by AMPS servers 26 is to be desirably carried by the CDMA technology during a projected period of time.

The present invention is described in terms of a cell-based, or sector-based, migration strategy. That is, proportion FIG. 100 of twenty-five percent indicates that the call traffic load will be reduced uniformly in each of sections 68 of first subset of sections 80 defining first AMPS cell 30' of first AMPS server 26'. However, the present invention is not limited to a uniform migration strategy. Rather, a non-uniform migration strategy may be employed. For example, a distance-based or a terrain-based strategy may be employed.

A distance-based strategy may be used when the size of the cell, or footprint, using the technology type for which traffic is to be shifted to is smaller than the size of the cell, using the technology type for which traffic is to be shifted from. Using a distance-based strategy, only those sections 68 of the two cells that overlap each other will reflect the shift in call traffic loads, while the traffic loads of the non-overlapping sections will remain unchanged. A terrain-based strategy is one in which individual sections 68 may have more or less call traffic that migrates to the other technology responsive to a type of terrain, for example, a lake, forest, mountain, and so forth.

Following task 98, a task 102 is performed. Task 102 causes processor 38 to compute a quantity of the first call traffic load to shift from the first technology to the second technology. Referring to FIGS. 5–6, FIG. 6 shows a data structure 104 of updated first and second traffic maps 64 and 66, respectively, generated through the execution of call traffic migration modeling process 58 (FIG. 5).

Since proportion FIG. 100 of twenty-five percent was determined at task 98, for each of sections 68 of first subset of sections 80, task 102 causes processor 38 to compute a quantity 110, i.e., twenty-five percent of amounts 87 for each of sections 68 of first subset 80. That is, quantity 110, equivalent to 0.025 Erlangs, will migrate from control by first AMPS server 26' to control by first CDMA server 28'.

Following task 102, a query task 112 is performed. Query task 112 determines if there are any of sections 68 of first subset of sections 80 that are distinct from sections 68 of second subset of sections 88 (FIG. 4). Since first AMPS cell 30' and first CDMA cell 32' are defined by recognizing the unique characteristics of the separate technologies, cells 30' and 32' need not have the same "footprint". In other words, cells 30' and 32' need not be identical. Distinct ones of sections 68 are those sections 68 of first subset 80 that were not previously common to sections 68 of second subset 88. For example, referring momentarily to data structure 71 (FIG. 4) sections 68, labeled 1 and 2, of first subset 80 are not common to second subset 88. Accordingly, sections 68, labeled 1 and 2, are referred to herein as distinct sections 114. In addition, those of sections 68, labeled 3–50, common to both of first and second subsets 80 and 88, respectively, are referred to herein as common sections 116.

Referring back to FIGS. 5–6, when query task 112 identifies distinct sections 114, process 58 proceeds to a task 118. At task 118, processor 38 (FIG. 2) includes distinct sections 114 in updated second traffic map 66 to adjust the range, or footprint, of first CDMA cell 32'. For the exemplary scenario, following task 118, the range of updated second traffic map 66 is sections 68, labeled 1–104, as contrasted with sections 68, labeled 3–104, of second traffic map 62 (FIG. 4).

Following task 118, a task 120 is performed. Likewise, when query task 112 fails to identify any distinct sections 114 (FIG. 4), process 58 proceeds to task 120. Task 120 associates computed quantities 110 (FIG. 6) of first call traffic load 84 (FIG. 4) with distinct sections 114 (FIG. 6) in updated second traffic map 66. As shown in data structure 104, the execution of task 120 results in each of distinct sections 114 of updated second traffic map 66 having associated therewith, quantity 110, of 0.025 Erlangs of call traffic.

A task 122 is performed in conjunction with task 120. Task 122 associates computed quantities 110 of first call traffic load 84 with common sections 116. As shown in data structure 104, the execution of task 122 results in sections 116, labeled 3–50 which are common to both of first and second subsets 80 and 88, respectively, having associated therewith, quantity 110, of 0.025 Erlangs of call traffic.

A task 124 is performed in response to task 122. For each of common sections 116, task 122 causes processor 38 (FIG. 2) to sum quantity 110 of first call traffic load 84 (FIG. 4) to be shifted with amounts 89 of second call traffic load 90 (FIG. 2) allocated to common sections 116 during the execution of traffic map generation process 56 (FIG. 3). As shown in data structure 104, the execution of task 124 results in common sections 116, labeled 3–50, having an updated amount 126 of call traffic of 0.175 Erlangs. Since sections 68, labeled 51–104, of second subset 88 are not common with any of sections 68 of first subset 80, traffic carried amounts 89 and 91 of sections 68, labeled 51–104 remain unchanged.

Following task 124, a task 127 is performed. At task 127, processor 38 (FIG. 2) compiles computed quantities 110 with the call traffic carried by each of sections 68, labeled 1–104, of updated second call traffic map 66 to adjust second call traffic load 90 (FIG. 4) to an updated second call traffic load 128. Accordingly, for the illustrative example shown in data structure 104, updated second call traffic load 128 controlled by first CDMA server 28' is increased to 16.25 Erlangs.

A task 130 is performed in cooperation with task 127. At task 130, processor 38 removes quantity 110 from the call traffic carried for each of sections 68, labeled 1–50, of updated first traffic map 64 to adjust first call traffic load 84 (FIG. 4) to an updated first call traffic load 132. Accordingly, for the illustrative example shown in data structure 104, first call traffic load 132 controlled by first AMPS server 26' is decreased to 3.75 Erlangs. Following task 130, process 58 exits. Process 58 may be subsequently executed for each of AMPS and CDMA servers 26 and 28, respectively, for which call traffic migration is to be modeled.

In summary, the present invention teaches of a system and method for modeling migration of call traffic from a first server operating using a first technology type to a second server operating using a second technology type in a multiple mode network. The system and method accurately model call traffic migration by accounting for the unique characteristics of the technologies utilized in the multiple mode network. In particular, the radio coverage areas are defined relative to specific technology under which the servers are operating. Thus, the defined radio coverage areas closely portray the radio coverage areas in an actual environment. These unique radio coverage areas are taken into account when distributing call traffic over these radio coverage areas. The system and method utilize radio coverage areas that closely depict the actual radio coverage areas of each of the first and second servers so that call traffic loads for overlapping cells may be accurately portrayed.

Although the preferred embodiments of the invention have been illustrated and described in detail, it will be readily apparent to those skilled in the art that various modifications may be made therein without departing from the spirit of the invention or from the scope of the appended claims. For example, those skilled in the art will appreciate that the present invention will accommodate a wide variation in the specific tasks and the specific task ordering used to accomplish the processes described herein.

What is claimed is:

1. In a multiple mode wireless network in which a first server operates using a first technology type and a second server operates using a second technology type, a computer-based method for modeling migration of call traffic from said first server to said second server comprising:

generating a first traffic map having a first call traffic load distributed over a first radio coverage area of said first server;

generating a second traffic map having a second call traffic load distributed over a second radio coverage area of said second server;

determining a proportion of said first call traffic load to shift from said first server to said second server; and adapting said second traffic map to include said proportion of said first call traffic load and to adjust said second call traffic load to obtain an adjusted second call traffic load controllable by said second server.

2. A computer-based method as claimed in claim 1 wherein said generating said first traffic map comprises:

representing said network by a plurality of sections;

defining said first radio coverage area to contain a first subset of said sections; and distributing amounts of said first call traffic load to said sections of said first radio coverage area.

3. A computer-based method as claimed in claim 2 wherein said distributing operation uniformly distributes said amounts of said first call traffic load to said sections.

4. A computer-based method as claimed in claim 2 wherein said distributing operation non-uniformly distributes said amounts of said first call traffic load to said sections.

5. A computer-based method as claimed in claim 2 wherein said generating said second traffic map comprises:

defining said second radio coverage area to contain a second subset of said sections; and allocating amounts of said second call traffic load to said sections of said second radio coverage area.

6. A computer-based method as claimed in claim 5 wherein said allocating operation uniformly allocates said amounts of said second call traffic load to said sections of said second subset.

7. A computer-based method as claimed in claim 5 wherein said allocating operation non-uniformly allocates said amounts of said second call traffic load to said sections of said second subset.

8. A computer-based method as claimed in claim 1 wherein said adjusting operation comprises:

representing said network by a plurality of sections;

defining said first radio coverage area to contain a first subset of said sections;

defining said second radio coverage area to contain a second subset of said sections;

for each of said sections of said first subset, computing a quantity of said first call traffic load, responsive to said proportion, to be shifted from said first server to said second server;

compiling said computed quantities; and combining said computed quantities with said second call traffic load to obtain said adjusted second call traffic load controllable by said second server.

9. A computer-based method as claimed in claim 8, wherein said combining operation comprises:

identifying ones of said sections that are common to each of said first and second subsets of said sections; and for each of said common sections, said combining operation further comprises:

determining an amount of said second call traffic load allocated to said common section; and summing said computed quantity with said amount to determine, for said common section, a portion of said adjusted second call traffic load controllable by said second server.

10. In a multiple mode wireless network in which a first server operates using a first technology type and a second server operates using a second technology type, a computer-based method for modeling migration of call traffic from said first server to said second server comprising:

generating a first traffic map having a first call traffic load distributed over a first radio coverage area of said first server;

generating a second traffic map having a second call traffic load distributed over a second radio coverage area of said second server;

determining a proportion of said first call traffic load to shift from said first server to said second server; and adapting said second traffic map to include said proportion of said first call traffic load and to adjust a range of said second radio coverage area to include said first radio coverage area.

11. A computer-based method as claimed in claim 10 wherein said adjusting operation comprises:

representing said network by a plurality of sections;

defining said first radio coverage area to contain a first subset of said sections;

defining said second radio coverage area to contain a second subset of said sections;

identifying ones of said sections of said first subset that are distinct from said sections of said second subset; and including said distinct sections in said second traffic map to adjust said range.

12. A computer-based method as claimed in claim 11 further comprising:

identifying ones of said sections that are common to each of said first and second subsets of said sections;

for each of said common sections, computing a quantity of said first call traffic, responsive to said proportion, to be shifted from said first server to said second server;

for each of said distinct sections, computing said quantity of said first call traffic load, responsive to said proportion, to be shifted from said first server to said second server; and compiling said computed quantities for each of said distinct and common sections with said second call traffic load to obtain an adjusted second call traffic load controllable by said second server.

13. A computer-based method as claimed in claim 10 further comprising removing said proportion of said first call traffic load from said first traffic map.

14. In a multiple mode wireless network in which a first server operates using a first technology type and a second server operates using a second technology type, a computing system for modeling migration of call traffic from said first server to said second server comprising:

a processor;

a memory element, in communication with said processor, having stored therein a plurality of sections representing said network, a first subset of said sections describing a first radio coverage area of said first server, and a second subset of said sections describing a second radio coverage area of said second server;

an input element, in communication with said processor, for receiving a first figure representing a first call traffic load controllable by said first server, a second figure representing a second call traffic load controllable by said second server, and a proportion figure for determining a proportion of said first call traffic load to shift from said first server to said second server;

a computer-readable storage medium; and executable code recorded on said computer-readable storage medium for instructing said processor to perform operations comprising:

generating a first traffic map having said first call traffic load distributed over said sections of said first subset;

generating a second traffic map having said second call traffic load distributed over said sections of said second subset;

for each of said sections of said first subset, computing a quantity of said first call traffic load, responsive to said proportion figure, to shift from said first server to said second serve; and adapting said second traffic map to include said sections of said first subset and said computed quantities for each of said sections of said first subset.

15. A computing system as claimed in claim 14 wherein said executable code further instructs said processor to perform a further operation comprising removing said computed quantities for each of said sections of said first subset from said first traffic map.

16. A computer-readable storage medium containing executable code for instructing a computer to model migration of call traffic in a multiple mode wireless network, said wireless network having a first server operating using a first technology type and a second server operating using a second technology type, said executable code instructing said computer to perform operations comprising:

generating a first traffic map having a first call traffic load distributed over a first radio coverage area of said first server;

generating a second traffic map having a second call traffic load distributed over a second radio coverage area of said second server;

determining a proportion of said first call traffic load to shift from said first server to said second server; and adapting said second traffic map to include said proportion of said first call traffic load, said adapting operation including:

adjusting a range of said second radio coverage area to include said first radio coverage area; and adjusting said second call traffic load controllable by said second server to include a quantity of said first call traffic load in response to said determined proportion.

17. A computer-readable storage medium as claimed in claim 16 wherein said executable code instructs said computer to perform further operations comprising:

representing said network by a plurality of sections;

defining said first radio coverage area to contain a first subset of said sections;

defining said second radio coverage area to contain a second subset of said sections;

identifying ones of said sections of said first subset that are distinct from said sections of said second subset; and including said distinct sections in said second traffic map to adjust said range of said second traffic map.

18. A computer-readable storage medium as claimed in claim 17 wherein said executable code instructs said computer to perform further operations comprising:
- identifying ones of said sections that are common to each of said first and second subsets of said sections;
- for each of said distinct and common sections, computing a quantity of said first call traffic, responsive to said proportion, to be shifted from said first server to said second server; and
- compiling said computed quantities for each of said distinct and common sections with said second call traffic load to obtain an adjusted second call traffic load controllable by said second server.

19. A computer-readable storage medium as claimed in claim 18 wherein for each of said common sections, said executable code instructs said computer to perform further operations comprising:
- determining an amount of said second call traffic load allocated to said common section; and
- summing said computed quantity with said amount to determine, for said common section, a portion of said adjusted second call traffic load controllable by said server.

* * * * *